UNITED STATES PATENT OFFICE.

HUGH EDWARD PLUNKETT, OF MALDEN, MASSACHUSETTS, ASSIGNOR TO UNITED STATES TROPICAL FOOD COMPANY, OF MALDEN, MASSACHUSETTS, A CORPORATION OF MASSACHUSETTS.

FOOD FOR ANIMALS.

1,188,678.  Specification of Letters Patent.  Patented June 27, 1916.

No Drawing.  Application filed November 23, 1914.  Serial No. 873,458.

*To all whom it may concern:*

Be it known that I, HUGH EDWARD PLUNKETT, of Malden, in the county of Middlesex and State of Massachusetts, have invented certain new and useful Improvements in Foods for Animals, of which the following is a specification.

My invention relates to a new and useful food for animals and has for its object a nutritious and wholesome and at the same time relatively inexpensive food for animals. This food consists of the composition of matter hereinafter described.

The basis of my composition is the bodies of bananas. These bodies are kiln dried or otherwise dried, until practically all the moisture is evaporated. The dried bodies are then ground or otherwise reduced to fragments. These fragments while extremely valuable as a food for animals, is too highly concentrated; and to overcome this objection I mix it with suitable ingredients to increase its bulk and at the same time impart other nutritious properties.

The following materials may be used for this purpose in preparing a food for animals: First; banana skins, either ripe or green, or a mixture of ripe and green skins, these being dried and reduced to small fragments by grinding or chopping. Secondly; bastard cedar seeds, a tropical product; the seeds being dried and ground. The bastard cedar seeds are especially valuable for stock fattening purposes. Thirdly; chopped hay. Fourthly; crushed oats. Banana bodies are obtainable in large quantities and at a very low cost. They contain a large percentage of starch and other ingredients useful for fattening purposes. The composition may be confined to the dried green banana meats and either of the above mentioned bulk-increasing ingredients, giving preference to the ground bastard cedar seeds. I prefer, however, to employ all of said ingredients.

My invention may be embodied in either of the following mixtures in about the proportions stated.

(A) Dried green banana meats_____lbs.__ 33⅓%
    Ground banana skins, or ground corn, or chopped hay, or crushed oats_____lbs.__ 66⅔%
(B) Dried green banana meats_____lbs.__ 80 %
    Ground bastard cedar seeds_____lbs.__ 20 %
(C) Dried green banana meats_____lbs.__ 33⅓%
    Chopped hay_____lbs.__ 66⅔%
(D) Dried green banana meats_____lbs.__ 25 %
    Ground banana skins, or ground corn_____lbs.__ 50 %
    Chopped hay_____lbs.__ 15 %
    Ground bastard cedar seeds_____lbs.__ 10 %

Each mixture A, or B or C, or D, is mixed into a dough by adding a little water and salt to the composition or mixture, then that dough is put into a rolling machine that compresses and molds the composition into grain similar in size to rice or barley. These should then be dried in any suitable manner.

Having thus described the nature of my invention, what I claim and desire to secure by Letters Patent of the United States is:

1. An animal food product comprising dried banana meats and dried banana skins and other bulk increasing ingredient.

2. An animal food product comprising dried banana meats, dried banana skins and ground bastard cedar seeds.

3. An animal food product comprising dried banana meats, dried banana skins and ground bastard cedar seeds, crushed oats, ground maize and chopped hay in the proportions substantially as hereinbefore described.

In testimony whereof, I have signed my name to this specification in the presence of two subscribing witnesses this twenty-seventh day of October A. D. 1914.

HUGH EDWARD PLUNKETT.

Witnesses:
  MARGARET G. MACMILLAN,
  MARY E. RYAN.

Copies of this patent may be obtained for five cents each, by addressing the "Commissioner of Patents, Washington, D. C."